US011077723B2

United States Patent
Sano

(10) Patent No.: US 11,077,723 B2
(45) Date of Patent: Aug. 3, 2021

(54) PNEUMATIC TIRE

(71) Applicant: Sumitomo Rubber Industries, Ltd., Kobe (JP)

(72) Inventor: Haruyuki Sano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 283 days.

(21) Appl. No.: 15/813,587

(22) Filed: Nov. 15, 2017

(65) Prior Publication Data

US 2018/0134099 A1 May 17, 2018

(30) Foreign Application Priority Data

Nov. 16, 2016 (JP) .............................. JP2016-223472

(51) Int. Cl.
| | |
|---|---|
| *B60C 15/00* | (2006.01) |
| *B60C 15/04* | (2006.01) |
| *B60C 15/05* | (2006.01) |
| *B29D 30/48* | (2006.01) |

(52) U.S. Cl.
CPC .............. *B60C 15/05* (2013.01); *B29D 30/48* (2013.01); *B60C 15/0027* (2013.01); *B60C 15/04* (2013.01); *B60C 2015/046* (2013.01); *B60C 2200/04* (2013.01); *B60C 2200/10* (2013.01)

(58) Field of Classification Search
CPC ... B60C 15/04; B60C 15/05; B60C 2015/046; B60C 15/0018; B60C 2015/048
USPC .................................................. 152/539, 545
See application file for complete search history.

(56) References Cited

U.S. PATENT DOCUMENTS

| | | | | |
|---|---|---|---|---|
| 2,966,933 A | * | 1/1961 | Saint-Frison ........... | B60C 15/04 152/540 |
| 3,942,574 A | | 3/1976 | Bantz | |
| 4,823,857 A | * | 4/1989 | Orjela ..................... | B60C 15/04 152/540 |
| 5,099,902 A | * | 3/1992 | Shurman ................. | B60C 15/04 152/539 |
| 5,307,853 A | * | 5/1994 | Okuda .................... | B60C 15/04 152/540 |

(Continued)

FOREIGN PATENT DOCUMENTS

| | | |
|---|---|---|
| DE | 41 37 726 A1 | 5/1992 |
| JP | 2005-507339 A | 3/2005 |

(Continued)

OTHER PUBLICATIONS

JP-2013199236-A Machine English Translation (Year: 2013).*

(Continued)

*Primary Examiner* — Robert C Dye
*Assistant Examiner* — Edgaredmanuel Troche
(74) *Attorney, Agent, or Firm* — Birch, Stewart, Kolasch & Birch, LLP

(57) ABSTRACT

A pneumatic tire 1 comprises an annular bead core 5 embedded in each bead portion 4 of the tire. The bead core 5 is composed of a plurality of wire rings 10 each of which is made of a spirally overlap-wound bead wire 11 and which are arranged in the tire axial direction. The wire rings 11 include a first ring 13 whose bead wire 11 is a twisted cord 13a made of a plurality of filaments 15 twisted together, and a second ring 14 whose bead wire 11 is a monofilament cord 14a made of a single filament.

19 Claims, 6 Drawing Sheets

(56) References Cited

U.S. PATENT DOCUMENTS

| | | | |
|---|---|---|---|
| 6,598,642 B1* | 7/2003 | Hirai | B60C 15/0018 |
| | | | 152/539 |
| 6,612,354 B2* | 9/2003 | Miyazaki | B60C 9/0007 |
| | | | 152/527 |
| 2005/0087278 A1 | 4/2005 | Daghini et al. | |
| 2009/0194215 A1* | 8/2009 | Daghini | B60C 15/04 |
| | | | 152/540 |
| 2013/0186542 A1* | 7/2013 | Aoki | B60C 15/04 |
| | | | 152/539 |
| 2013/0233460 A1* | 9/2013 | Schaffhauser | B60C 15/0018 |
| | | | 152/539 |
| 2013/0340910 A1* | 12/2013 | Miao | B29D 30/08 |
| | | | 152/539 |
| 2015/0328938 A1* | 11/2015 | Isaka | B60C 15/04 |
| | | | 152/539 |
| 2017/0348932 A1* | 12/2017 | Pialot | B60C 15/0018 |

FOREIGN PATENT DOCUMENTS

| | | | |
|---|---|---|---|
| JP | 2013056566 A | * | 3/2013 |
| JP | 2013199236 A | * | 10/2013 |
| WO | WO 2008/061544 A1 | | 5/2008 |

OTHER PUBLICATIONS

English Machine Translation of Iida, Toshihiro JP-2013056566-A (Year: 2013).*
English Machine Translation of Iida, Toshihiro JP-2013199236-A (Year: 2013).*
Extended European Search Report dated Apr. 6, 2018, in European Patent Application No. 17201624.8.

* cited by examiner

PNEUMATIC TIRE

FIELD OF THE INVENTION

The present invention relates to a pneumatic tire, more particularly to a bead core disposed in a bead portion of the tire.

BACKGROUND ART

Conventionally, a bead core disposed in a bead portion of a pneumatic tire is formed by winding a bead wire in a plurality of layers.

As such a bead wire, a twisted cord formed by twisting a plurality of filaments together has been known. By using a twisted cord as the bead wire, the bead portion is provided with flexibility, and the ride comfort performance of the tire may be improved. On the negative side, the binding force provided by the bead core between the bead portion and the wheel rim is relatively reduced, and there is a possibility that the steering/handling stability and the uniformity of the tire are deteriorated.

Further, as a bead wire, a monofilament cord made up a single filament has been also known. Such monofilament cord, for example, steel monofilament cord has a relatively high tensile modulus, and the binding force provided by the bead core between the bead portion and the wheel rim is increased. Therefore, the steering/handling stability and the uniformity of the tire can be improved. However, as the flexibility of the bead portion is decreased, there is a possibility that the ride comfort performance is deteriorated.

SUMMARY OF THE INVENTION

It is therefore, an object of the present invention to provide a pneumatic tire in which, by improving the bead core, the ride comfort performance, steering the stability and uniformity can be improved in good balance.

According to the present invention, a pneumatic tire comprises: an annular bead core embedded in a bead portion of the tire, wherein
the bead core is composed of a plurality of wire rings each of which is made of a spirally overlap-wound bead wire and which are arranged in the tire axial direction, and
the wire rings include a first ring whose bead wire is a twisted cord made of a plurality of filaments twisted together, and a second ring whose bead wire is a monofilament cord made of a single filament.

Preferably, a bending rigidity of the twisted cord is lower than a bending rigidity of the monofilament cord.

Preferably, the bending rigidity of the twisted cord is 0.10 to 0.29 times the bending rigidity of the monofilament cord.

Preferably, the bending rigidity of the twisted cord is 100 N to 260 N.

Preferably, an elongation of the twisted cord is not less than 0.03% when a tension of the twisted cord is increased from 2.5 N to 49.0 N.

Preferably, the axially outermost wire ring in the bead core is the first ring.

Preferably, the number of the first ring(s) is not less than the number of the second ring or ring(s).

Preferably, the number of spiral turns of the bead wire of each wire ring is not less than 1.5 times the number of the wire rings arranged in the tire axial direction.

Preferably, the radially outer end of the bead core is positioned radially inside the radially outer end of a rim flange when the pneumatic tire is mounted on a standard wheel rim having the rim flange and inflated to a standard pressure and loaded with no tire load.

Preferably, the twisted cord has a layer twist structure comprising a core filament, and sheath filaments surrounding the core filament.

Preferably, the twisted cord has a bunch twisted structure in which all the filaments as a bunch are twisted in one direction.

Therefore, in the pneumatic tire according to the present invention, the first ring made of the twisted cord provides flexibility for the bead portion of the pneumatic tire to improve the ride comfort performance. The second ring made of the monofilament cord provides rigidity for the bead portion of the pneumatic tire to prevent a decrease in the binding force of the bead core to the wheel rim to improve the steering/handling stability and the uniformity. As a result, the pneumatic tire according to the present invention is improved in the ride comfort performance, steering/handling stability and uniformity in good balance.

DESCRIPTION OF THE PREFERRED EMBODIMENTS

The present invention is suitably applied to a motorcycle tire as well as a passenger car tire.

Taking a motorcycle tire as example, embodiments of the present invention will now be described in detail in conjunction with the accompanying drawings.

Figure 1:
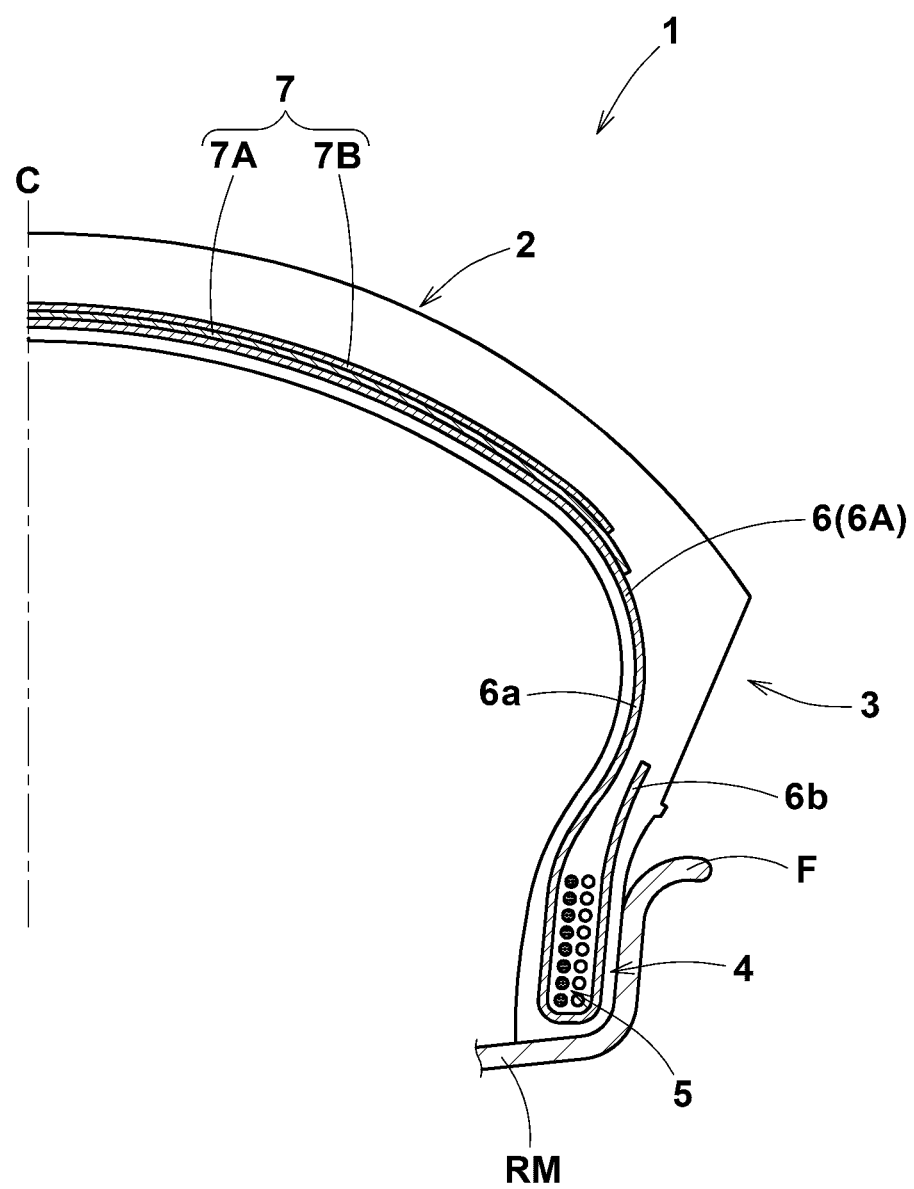
FIG. 1 is a cross sectional half view of a pneumatic tire as an embodiment of the present invention.

In FIG. 1, a pneumatic tire 1 as an embodiment of the present invention is mounted on a standard wheel rim RM and inflated to a standard pressure, and no tire load is applied thereto. Hereinafter, such condition is called "normally inflated unloaded condition".

The standard wheel rim RM is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, the standard pressure is uniformly defined by 180 kPa.

In this application including specification and claims, various dimensions, positions and the like of the tire refer to those under the normally inflated unloaded condition of the tire unless otherwise noted.

As shown in FIG. 1, the pneumatic tire 1 comprises a tread portion 2 whose outer surface defines the tread, a pair of axially spaced bead portions 4 mounted on rim seats of the wheel rim RM, a pair of sidewall portions 3 extending between the tread edges and the bead portions, a carcass 6 extending between the bead portions 4 through the tread portion 2 and the sidewall portions 3, a belt 7 disposed radially outside the carcass 6 in the tread portion 2, and a bead core 5 disposed in each of the bead portions 4.

The carcass 6 is composed of at least one carcass ply 6A, in the present embodiment only one carcass ply 6A.
The carcass ply 6A is made of carcass cords arranged radially at an angle of from 75 to 90 degrees with respect to the tire equator C, and extending between the bead portions 4 through the tread portion 2 and the sidewall portions 3, and turned up around the bead core 5 in each of the bead portions from the axial inside to the axially outside of the tire, so as to form a pair of turned up portions 6b and a main portion 6a therebetween. As the carcass cords, for example, organic fiber cords and/or steel cords can be used.

The belt 7 in the present embodiment is composed of two radially inner and outer belt plies 7A and 7B each made of belt cords laid at an angle of from 15 to 45 degrees with respect to the tire equator C.
As the belt cords, for example, steel cords, aramid cords, rayon cords and the like can be suitably used.

Figure 2:
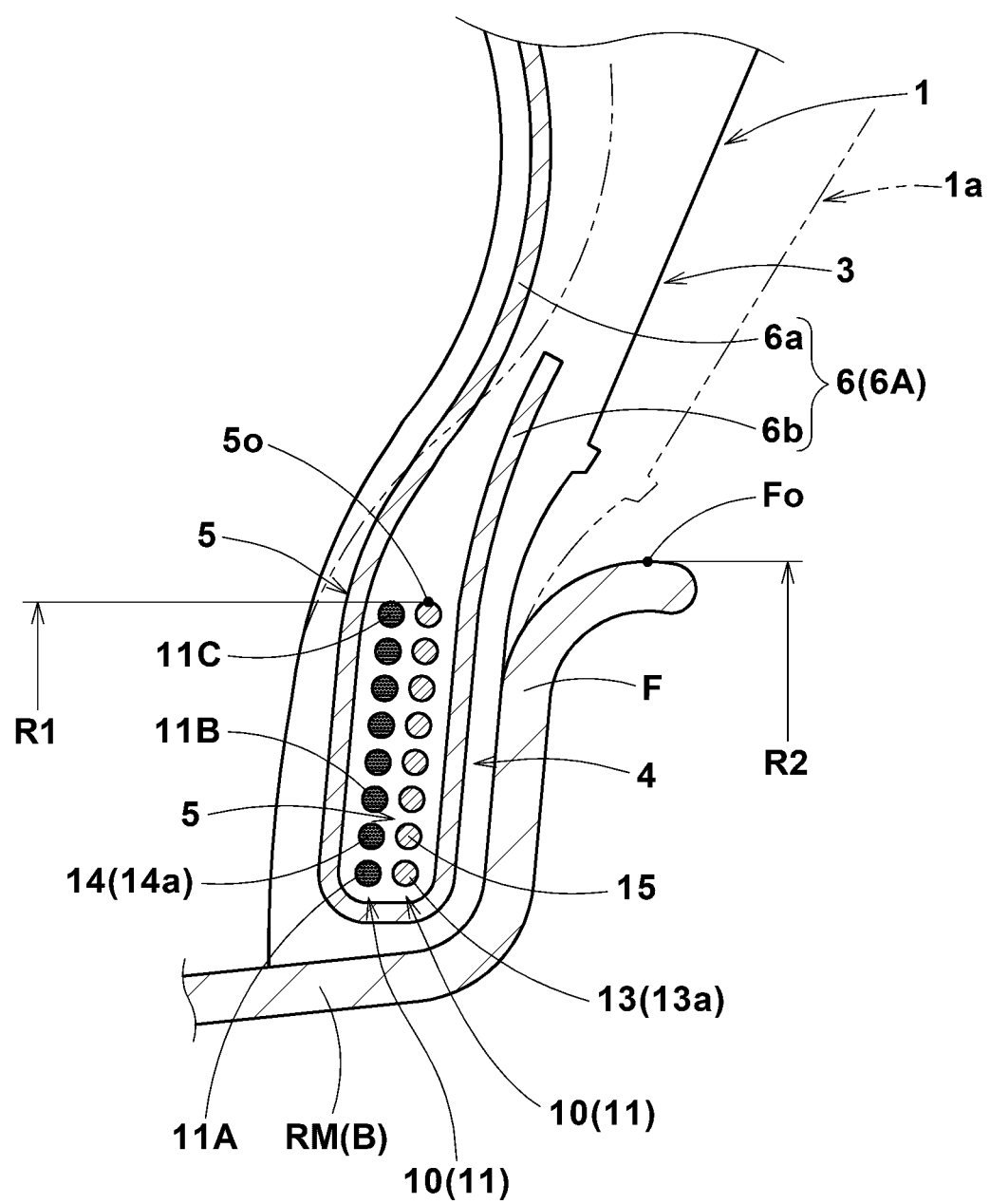
FIG. 2 is a cross sectional view of the bead portion thereof.

The bead cores 5 are each composed of wire rings 10 arranged in the tire axial direction.
In the present embodiment, as shown in FIG. 2, the bead core 5 is composed of two wire rings 10.

Figure 3:
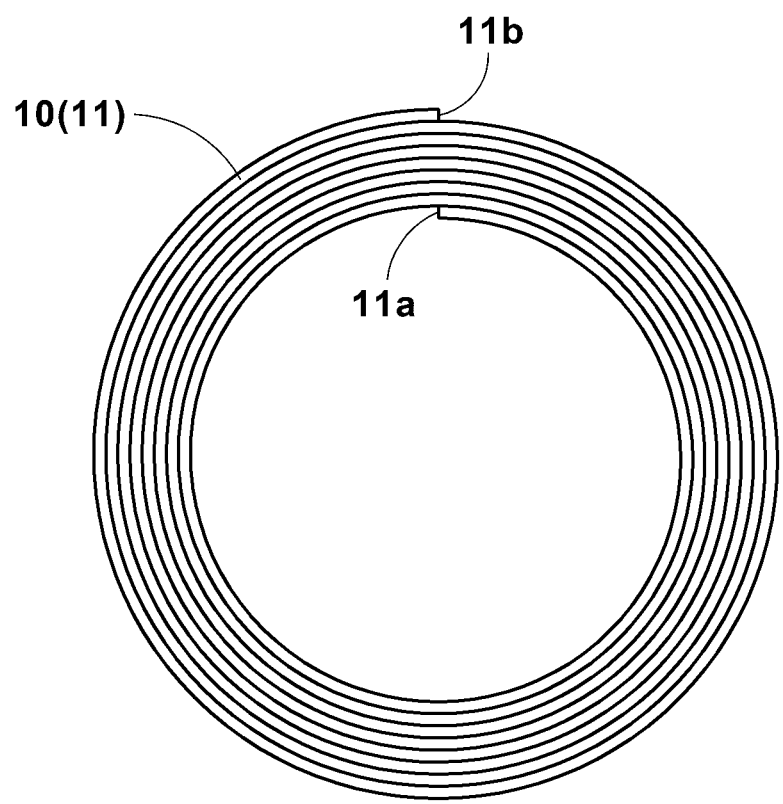
FIG. 3 is a schematic side view of a wire ring.

As shown in FIG. 3 which is a side view of a wire ring 10, the wire ring 10 is made of a bead wire 11 spirally overlap-wound in a ring shape. Thus, each of the wire rings 10 includes two ends of the bead wire 11: a winding-starting end 11a and a winding-ending end lib. From a point of view of uniformity, it is preferable that the two ends 11a and 11b are positioned at substantially same circumferential positions.

The wire rings 10 constituting the bead core include a first ring 13 and a second ring 14.
The first ring 13 is such that its bead wire 11 is a twisted cord 13a (shown in FIG. 4) made up of a plurality of filaments 15 twisted together.
The second ring 14 is such that its bead wire 11 is a monofilament cord 14a made up of a single filament.
The first ring 13 made of the twisted cord 13a increases the flexibility of the bead portion 4 of the tire 1 to improve the ride comfort performance of the tire.
As the rigidity of the monofilament cord 14a is high, the second ring 14 made of the monofilament cord 14a prevents a decrease in the binding force of the bead core 5 to the wheel rim RM to improve the steering/handling stability.
In the present invention, accordingly, the tire 1 can be improved in the ride comfort performance, steering the stability and uniformity in good balance.

It is preferable that the bending rigidity of the twisted cord 13a is lower than the bending rigidity of the monofilament cord 14a.
If the bending rigidity of the twisted cord 13a is higher than the bending rigidity of the monofilament cord 14a, there is a possibility that the diameter d1 of the twisted cord 13a is excessively increased, increasing the tire weight, and the ride comfort performance is deteriorated. If the bending rigidity of the twisted cord 13a is excessively lower than the bending rigidity of the monofilament cord 14a, there is a possibility that the rigidity of the first ring 13 is decreased and the steering/handling stability is deteriorated.

In order to more effectively derive the above-mentioned advantageous effects, it is preferred that the bending rigidity of the twisted cord 13a is 0.10 to 0.29 times the bending rigidity of the monofilament cord 14a.

Figure 7:
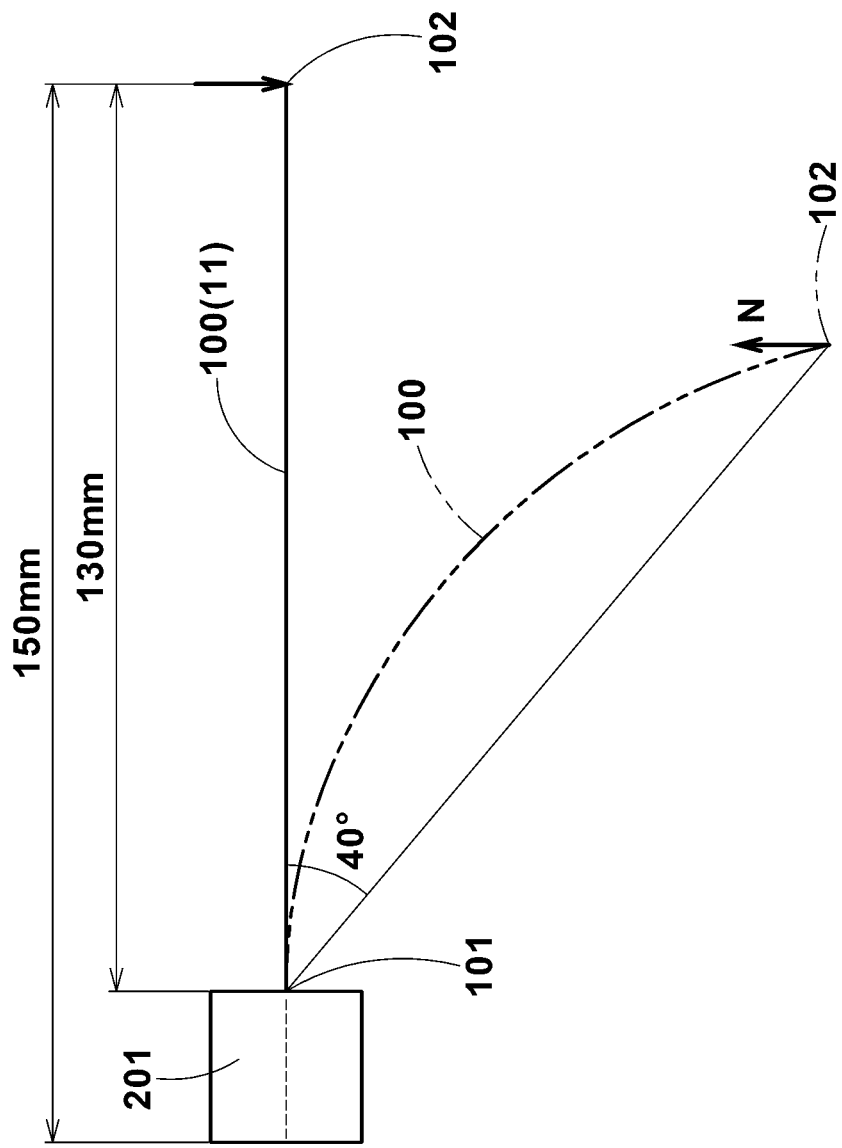
FIG. 7 is a diagram for explaining how to measure the bending rigidity of a bead wire.

In this specification, the bending rigidity is measured as follow, using a specimen 100 of 150 mm length prepared by melt-cutting the bead wire 11 not to be untwisted.
As shown in FIG. 7, a 20 mm long end portion of the specimen 100 is fixedly supported by a jig 201.
A force in the normal direction to the longitudinal direction of the specimen 100 is applied to the other free end 102 of the specimen 100 at 130 mm from the fixed end 101, and is gradually increased.
The force when the angle of a straight line drawn between the ends 101 and 102 with respect to the longitudinal direction becomes 40 degrees (resisting force N), is obtained as the bending rigidity.
For example, in order to measure the bending rigidity, a Stiffness Tester 150-D manufactured by Taber Industries can be used.

It is preferable that the bending rigidity of the twisted cord 13a is set in a range from 100 N to 260 N. If the bending rigidity of the twisted cord 13a is lower than 100 N, there is a possibility that the binding force of the bead core 5 to the wheel rim RM is decreased, affecting the steering/handling stability. If the bending rigidity is higher than 260 N, there is a possibility that the flexibility of the bead portion 4 becomes less, affecting the ride comfort performance. Further, there is a possibility that the twisted cord 13a becomes thick, increasing the tire weight, and the ride comfort performance is deteriorated.

It is preferable that the elongation of the twisted cord 13a when the tension is increased from 2.5 N to 49.0 N, is in a range from 0.03% to 0.75%.
If the elongation of the twisted cord 13a is less than 0.03%, there is a possibility that the flexibility of the bead wire 11 becomes insufficient, and the ride comfort performance is adversely affected. If the elongation of the twisted cord 13a is more than 0.75%, there is a possibility that the binding force of the bead core 5 to the wheel rim RM is decreased, and the steering/handling stability is adversely affected.

In order to effectively derive the above-mentioned advantageous effects, it is preferred that the elongation of the monofilament cord 14a when the tension is increased from 2.5 N to 49.0 N, is in a range from 0.03% to 0.07%.

Figure 4:
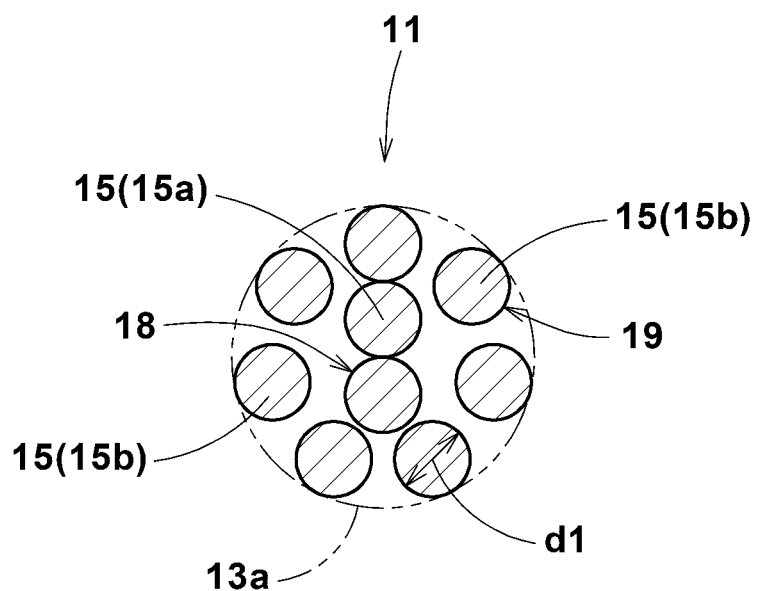
FIG. 4 is a schematic cross sectional view of a twisted cord.

In the present embodiment, as shown in FIG. 4, the twisted cord 13a as the bead wire 11 is composed of a plurality of core filaments 15a, and a plurality of sheath filaments 15b which are twisted together. More specifically, the twisted cord 13a has a layer twist structure in which an outer layer 19 made up of the sheath filaments 15b are twisted around a core 18 made up of the core filaments 15a. The bead wire 11 having such layer twist structure exerts excellent bendability to increase the flexibility of the bead portion 4.

It is preferable that the filaments 15 of the twisted cord 13a have a diameter d1 of from 0.15 to 0.45 mm.
If the diameter d1 is less than 0.15 mm, there is a possibility that the binding force of the bead core 5 is decreased, and the steering/handling stability is adversely affected. If the diameter d1 is not less than 0.45 mm, there is a possibility that the flexibility of the bead portion 4 becomes insufficient, and the ride comfort performance is adversely affected.

In FIG. 2, indicated by an alternate long and two short dashes line is a contour 1a of the tire 1 in the ground contacting patch when the tire is normally loaded. As shown, the bead portion 4 is bent toward the axially outside along the flange F of the wheel rim RM. As a result, the load acting on the bead seat B of the wheel rim RM becomes higher in the axially outer portion than in the axially inner portion.

It is therefore, preferable that the first ring 13 is disposed as the axially outermost wire ring 10 in the bead core 5.

In the present embodiment, the first ring 13 is axially outermost, and the second ring 14 is disposed axially inside the first ring 13.

Thereby, the first ring 13 having higher flexibility absorbs a large bending force, and the stress on the bead seat B is evened in the tire axial direction. As a result, the engaging force between bead portion of the tire 1 and the wheel rim RM becomes evened in the tire axial direction, and the steering/handling stability is improved.

It is preferable that the number of the spiral turns of the bead wire 11 is not less than 1.5 times the number of the wire rings 10 in the bead core.

When the spiral turns of the bead wire 11 is counted from the radially innermost turn 11A toward the radially outermost turn 11C, some of the spiral turns more than 1.0 times the number of the wire rings 10 can generate a larger tension upon the inflation of the tire 1 and the application of a tire load, and the binding force of the bead core 5 is increased to improve the steering/handling stability.

In the example of the wire ring 10 shown in FIG. 2, the number of the spiral turns is 8, and the number of the wire rings is 2. Therefore, some of the spiral turns from the 3rd turn 11B to the 8th outermost turn 11C when counted from the 1st innermost turn 11A can generate a larger tension to increase the binding force of the bead core 5.

If the number of the spiral turns of the bead wire 11 is excessively increased, there is a possibility that the tire weight is increased, and the ride comfort performance is deteriorated.

It is preferable that the radially outer end 5o of the bead core 5 is positioned radially inside the radially outer end Fo of the flange F, that is, the diameter R1 of the radially outer end 5o of the bead core 5 is less than the diameter R2 of the radially outer end Fo of the flange F.

As a result, the tire is provided with moderate flexibility from the bead portion 4 to a lower sidewall portion, and the bead portion 4 becomes easy to bend along the rim flange F. Thus, the ride comfort performance is improved.

Figure 5:
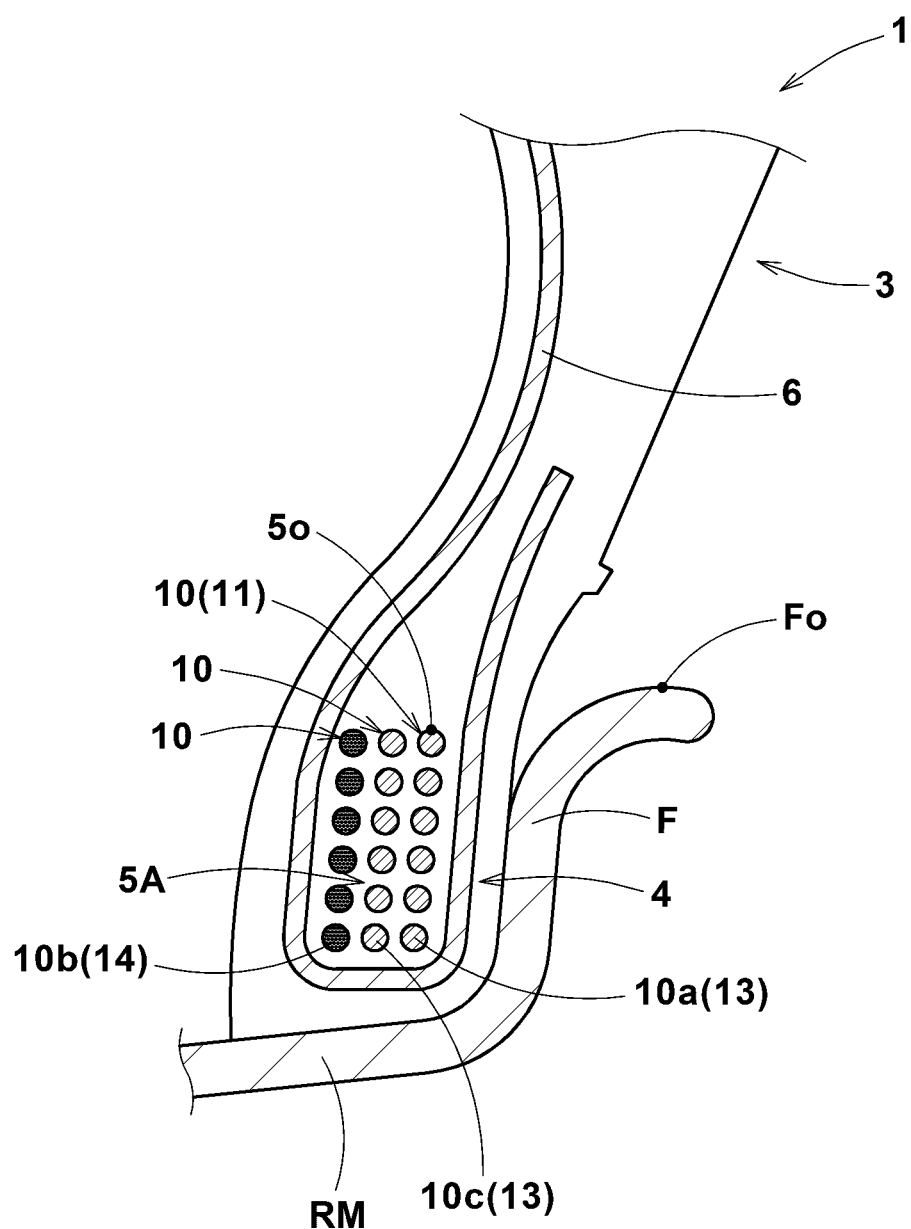
FIG. 5 is a cross sectional view of another example of the bead portion.

FIG. 5 shows another example of the bead core 5 embedded in the bead portion 4 as another embodiment of the present invention, wherein the bead core 5 is composed of three wire rings 10 arranged in the tire axial direction. The three wire rings 10 are an axially outermost wire ring 10a, an axially innermost wire ring 10b, and a middle wire ring 10c therebetween. The outermost wire ring 10a is the above-mentioned first ring 13. The innermost wire ring 10b is the above-mentioned second ring 14. The middle wire ring 10c is the first ring 13

As explained above, as the first ring 13 is axially outermost in the bead core 5, the steering/handling stability is improved. Further, as the first ring 13 is disposed in a middle region of the bead seat B in which the middle wire ring 10c is disposed (the middle region is acted by a larger force than an inner region of the bead seat B in which the innermost wire ring 10b is disposed), the load acting on the middle wire ring 10c is absorbed by the first ring 13. Therefore, the variation of the stress on the bead seat B becomes small, and the engaging force between the bead portion of the tire 1 and the wheel rim RM becomes evened. As a result, the steering/handling stability is improved.

In the bead core 5 composed of three wire rings 10, it is also possible that the middle wire ring 10c is the second ring 14 and the innermost wire ring 10b is the first ring 13.

In this case, as the rigidity of the bead core 5 is increased on both sides of the second ring 14 in the tire axial direction, the ride comfort performance during straight running becomes high in comparison with the example shown in FIG. 5.

When the bead core 5 is made up of three or more wire rings 10, it is preferred that the number of the first rings 13 is equal to or more than the number of the second ring(s) 14. Thereby, the flexibility of the bead core 5 and the rigidity of the bead portion 4 are secured in good balance, and the steering/handling stability, ride comfort performance and uniformity is effectively improved.

In this case too, it is preferable that the number of the spiral turns of the bead wire 11 is not less than 1.5 times the number of the wire rings 10 in the bead core. In the example shown in FIG. 5, the number of the spiral turns is 6, and the number of the wire rings 10 is 3. It is preferable that the radially outer end 5o of the bead core 5 is positioned radially inside the radially outer end Fo of the flange F.

Figure 6:
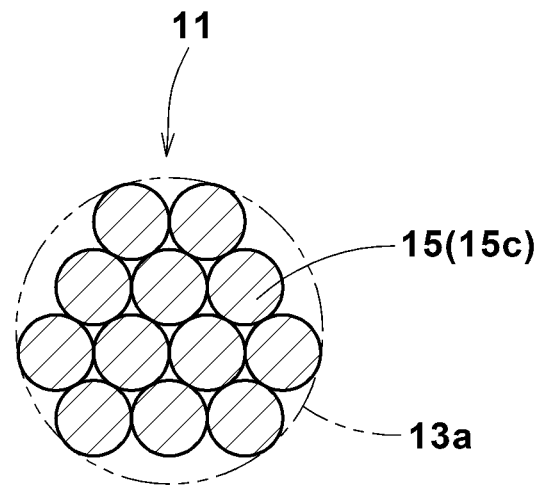
FIG. 6 is a schematic cross sectional view of another example of the twisted cord.

FIG. 6 shows a cord having a bunch twisted structure in which a plurality of filaments 15c constituting the cord are twisted all together in one direction. The cord having such a bunch twisted structure can be used as the low-cost twisted cord 13a.

The bead core 5 can be manufactured, for example, by firstly manufacturing the wire rings 10 separately from each other by spirally winding the rubberized bead wire 11, and then closely arranging the wire rings 10 to be combined into the bead core 5.

As another example of the manufacturing method, a tape of the bead wires 13a and 14a arranged side by side in the widthwise direction of the tape and rubberized is firstly manufactured, and then the tape is overlap wound into the bead core 5.

In either case, it is preferable that the rubberized bead wire 11 or the tape of the bead wires is wound within an annular guide groove formed around an annular jig.

As still another example of the manufacturing method, the bead wires 13a and 14a arranged side by side without being united are wound within an annular guide groove into the bead core 5.

While detailed description has been made of preferable embodiments of the present invention, the present invention can be embodied in various forms without being limited to the illustrated embodiment.

Comparison Tests

Based on the structure shown in FIG. 1, motorcycle tires of size 180/55ZR17 were experimentally manufactured and tested for the ride comfort performance, handling stability and uniformity. Aside from the bead cores, all the test tires had the same structure. Specifications of the bead cores are shown in Table 1. The filaments constituting all the bead wires were steel filaments. The bending rigidity of the monofilament cord was 900 N. The elongation of the monofilament cord was 0.032%. The carcass was composed of a single ply of nylon cords (2/1400 dtex, cord count 51/50 mm).

<Ride Comfort Performance Test>

Each test tire was ran over a protrusion having a height of 5 mm and a length of 5 mm in the traveling direction, and a reaction force when running over the protrusion and its convergence time were measured under the following condition: a speed 15 km/h, a tire pressure 290 kPa, a tire load 1.3 kN, and a wheel rim size MT5.50×17. The results are indicated in Table 1 by an index based on Ex1 being 100, wherein the larger the value, the better the performance.

<Handling Stability Test>
Using a 1300 cc motorcycle with the test tire mounted on the rear wheel under the above-mentioned condition, the handling stability during running on a dry asphalt road surface of a circuit test course was evaluated by the test rider based on the responsiveness, rigid feeling, grip, stability on a bumpy road surface and transient behavior. The results are indicated in Table 1 by an index based on Ex1 being 100, wherein the larger the value, the better the performance.

<Uniformity>
The radial runout (RR( )) of each test tire was measured according to JASO C607:2000 "Test Procedures for Automobile Tire uniformity". The results are indicated in Table 1 by an index based on Ex1 being 100, wherein the smaller the value, the better the uniformity.

TABLE 1

| Tire | Ref 1 | Ex 1 | Ref 2 | Ex 2 | Ex 3 | Ex 4 | Ex 5 | Ex 6 | Ex 7 |
|---|---|---|---|---|---|---|---|---|---|
| number of first ring(s) | 2 | 1 | 0 | 1 | 1 | 1 | 1 | 1 | 1 |
| number of second ring(s) | 0 | 1 | 2 | 1 | 1 | 1 | 1 | 1 | 1 |
| axial position of first ring *1 | — | OM | — | OM | OM | OM | OM | OM | OM |
| spiral turns of bead wire | 8 | 8 | 8 | 8 | 8 | 8 | 8 | 3 | 5 |
| radially outer end R1 of bead core twisted cord | R1 < R2 | R1 < R2 | R1 < R2 | R1 < R2 | R1 < R2 | R1 < R2 | R1 < R2 | R1 < R2 | R1 < R2 |
| twist structure (No. FIG.) | 4 | 4 | — | 4 | 4 | 4 | 4 | 4 | 4 |
| elongation (%) | 0.09 | 0.09 | — | 0.03 | 0.06 | 0.12 | 0.15 | 0.09 | 0.09 |
| diameter d1 of filaments (mm) | 0.37 | 0.37 | 0.96 | 0.45 | 0.37 | 0.37 | 0.15 | 0.37 | 0.37 |
| bending rigidity of twisted cord/ bending rigidity of monofilament cord | — | 0.2 | — | 0.29 | 0.26 | 0.14 | 0.11 | 0.2 | 0.2 |
| ride comfort performance | 105 | 100 | 85 | 96 | 98 | 100 | 102 | 102 | 100 |
| steering/handling stability | 90 | 100 | 104 | 102 | 100 | 98 | 96 | 96 | 98 |
| uniformity | 94 | 100 | 103 | 100 | 100 | 100 | 98 | 98 | 100 |

| Tire | Ex 8 | Ex 9 | Ex 10 | Ex 11 | Ex 12 | Ex 13 | Ex 14 | Ex 15 |
|---|---|---|---|---|---|---|---|---|
| number of first ring(s) | 1 | 1 | 1 | 1 | 1 | 2 | 2 | 2 |
| number of second ring(s) | 1 | 1 | 1 | 1 | 1 | 1 | 1 | 2 |
| axial position of first ring *1 | OM | OM | OM | OM | IM | OM & midel | OM and IM | OM & next |
| spiral turns of bead wire | 10 | 12 | 16 | 8 | 8 | 8 | 8 | 5 |
| radially outer end R1 of bead core twisted cord | R1 < R2 | R1 < R2 | R1 < R2 | R1 < R2 | R1 < R2 | R1 < R2 | R1 < R2 | R1 < R2 |
| twist structure (No. FIG.) | 4 | 4 | 4 | 6 | 4 | 4 | 4 | 4 |
| elongation (%) | 0.09 | 0.09 | 0.09 | 0.09 | 0.09 | 0.09 | 0.09 | 0.09 |
| diameter d1 of filaments (mm) | 0.37 | 0.37 | 0.37 | 0.37 | 0.37 | 0.37 | 0.37 | 0.37 |
| bending rigidity of twisted cord/ bending rigidity of monofilament cord | 0.2 | 0.2 | 0.2 | 0.2 | 0.2 | 0.2 | 0.2 | 0.2 |
| ride comfort performance | 100 | 98 | 96 | 102 | 98 | 98 | 96 | 96 |
| steering/handling stability | 100 | 102 | 102 | 98 | 98 | 102 | 104 | 104 |
| uniformity | 100 | 100 | 100 | 100 | 100 | 100 | 102 | 100 |

*1 OM = outermost, IM = innermost

From the test results, it was confirmed that, according to the present invention, the ride comfort performance, handling stability and uniformity can be improved in good balance.

REFERENCE SIGNS LIST 1 pneumatic tire
4 bead portion
5 bead core
10 wire ring
11 bead wire
13 first ring
13a twisted cord
14 second ring
14a monofilament cord
15 filament

The invention claimed is:

1. A pneumatic tire comprising
a tread portion,
a pair of sidewall portions,
a pair of bead portions,
an annular bead core embedded in each bead portion of the tire, and
a carcass comprising a carcass ply extending between the bead portions through the tread portion and the sidewall portions, and turned up around the bead core in each bead portion, wherein
the bead cores are each composed of a plurality of wire rings each of which is made of a spirally overlap-wound bead wire and which are arranged in the tire axial direction, and
said plurality of wire rings are arranged adjacently one next to the other in the tire axial direction, wherein
the bead cores each have a radially outer end and a radially inner end, and
the bead wire of each of the wire rings extends spirally and continuously from the radially outer end to the radially inner end of the bead core, wherein
the wire rings include a first ring configuration whose bead wire is a twisted cord made of a plurality of filaments twisted together, and a second ring configuration whose bead wire is a monofilament cord made of a single filament, wherein
said plurality of wire rings comprises an axially outermost wire ring which has the first ring configuration, a middle wire ring which has the first ring configuration disposed on the axially inside of the axially outermost wire ring, and an axially inner wire ring which has the second ring configuration disposed on the axially inside of the middle wire ring wherein the number of spiral turns of the bead wire of each wire ring is not less than 1.5 times the number of the wire rings arranged in the tire axial direction.

2. The pneumatic tire according to claim 1, wherein a bending rigidity of the twisted cord is lower than a bending rigidity of the monofilament cord.

3. The pneumatic tire according to claim 2, wherein the bending rigidity of the twisted cord is 0.10 to 0.29 times the bending rigidity of the monofilament cord.

4. The pneumatic tire according to claim 1, wherein the bending rigidity of the twisted cord is 100 N to 260 N.

5. The pneumatic tire according to claim 1, wherein an elongation of the twisted cord is not less than 0.03% when the tension of the twisted cord is increased from 2.5N to 49.0N.

6. The pneumatic tire according to claim 1, wherein the number of the wire ring or rings having the first ring configuration is not less than the number of the wire ring or rings having the second ring configuration.

7. The pneumatic tire according to claim 1, wherein the radially outer end of each of the bead cores is positioned radially inside a radially outer end of a rim-flange when the pneumatic tire is mounted on a standard wheel rim having said rim-flange and inflated to a standard pressure and loaded with no tire load.

8. The pneumatic tire according to claim 1, wherein the twisted cord has a layer twist structure comprising at least one core filament, and sheath filaments surrounding said at least one core filament.

9. The pneumatic tire according to claim 1, wherein the twisted cord has a bunch-twisted structure in which all the filaments as a bunch are twisted in one direction.

10. The pneumatic tire according to claim 1, wherein the bead core consists of three wire rings which are the axially outermost wire ring, the middle wire ring, and the axially inner wire ring.

11. The pneumatic tire according to claim 10, wherein the number of spiral turns of the bead wire of each wire ring is not less than 1.5 times the number of all of the wire rings.

12. The pneumatic tire according to claim 11, wherein said number of spiral turns is same for all of the wire rings.

13. The pneumatic tire according to claim 12, wherein the bending rigidity of the twisted cord is 0.10 to 0.29 times the bending rigidity of the monofilament cord.

14. The pneumatic tire according to claim 1, wherein the carcass consists of said carcass ply.

15. The pneumatic tire according to claim 1, wherein the number of the wire ring or rings having the first ring configuration is not less than the number of the wire ring or rings having the second ring configuration, the number of spiral turns of the bead wire of each wire ring is not less than 1.5 times the number of the wire rings arranged in the tire axial direction, and the twisted cord has a layer twist structure comprising at least one core filament, and sheath filaments surrounding said at least one core filament, or alternative a bunch-twisted structure in which all the filaments as a bunch are twisted in one direction, so that an elongation of the twisted cord is not less than 0.03% when the tension of the twisted cord is increased from 2.5N to 49.0N, a bending rigidity of the twisted cord is 0.10 to 0.29 times a bending rigidity of the monofilament cord, and the bending rigidity of the twisted cord is 100 N to 260 N.

16. The pneumatic tire according to claim 15, wherein the carcass consists of said carcass ply.

17. The pneumatic tire according to claim 16, wherein each of said plurality of wire rings is arranged in a plane substantially parallel with the tire radial direction, and said number of spiral turns is same for all of the wire rings.

18. The pneumatic tire according to claim 17, which is a motorcycle tire in which the tread portion is curved convexly so that the maximum tire cross section width occurs between tread edges.

19. A pneumatic tire comprising a tread portion,
a pair of sidewall portions,
a pair of bead portions,
an annular bead core embedded in each bead portion of the tire, and
a carcass comprising a carcass ply extending between the bead portions through the tread portion and the sidewall portions, and turned up around the bead core in each bead portion, wherein
the bead cores are each composed of a plurality of wire rings each of which is made of a spirally overlap-wound bead wire and which are arranged in the tire axial direction, and
said plurality of wire rings are arranged adjacently one next to the other in the tire axial direction, wherein
the bead cores each have a radially outer end and a radially inner end, and
the bead wire of each of the wire rings extends spirally and continuously from the radially outer end to the radially inner end of the bead core, wherein
the wire rings include a first ring configuration whose bead wire is a twisted cord made of a plurality of steel filaments twisted together, and a second ring configuration whose bead wire is a monofilament cord made of a single filament, wherein
said plurality of wire rings comprises an axially outermost wire ring which has the first ring configuration,
a middle wire ring which has the first ring configuration disposed on the axially inside of the axially outermost wire ring, and
an axially inner wire ring which has the second ring configuration disposed on the axially inside of the middle wire ring.

* * * * *